United States Patent [19]

Moritugu et al.

[11] Patent Number: 4,756,290
[45] Date of Patent: Jul. 12, 1988

[54] DRIVE CIRCUIT OF ELECTROSTRICTIVE ELEMENT ACTUATOR IN DIESEL ENGINE FUEL INJECTION DEVICE

[75] Inventors: Mitiyasu Moritugu, Nishio; Hisasi Kawai, Toyohashi; Yasuyuki Sakakibara, Nishio; Seiko Abe, Okazaki, all of Japan

[73] Assignee: Nippon Soken, Inc., Nishio, Japan

[21] Appl. No.: 864,863

[22] Filed: May 20, 1986

[30] Foreign Application Priority Data

May 20, 1985 [JP] Japan .................. 60-105929

[51] Int. Cl.$^4$ ........................... F02M 39/00
[52] U.S. Cl. .................. 123/494; 123/496; 123/447; 123/498
[58] Field of Search ......... 123/496, 498, 447, 494, 123/458; 73/119 A, DIG. 4

[56] References Cited

U.S. PATENT DOCUMENTS

| | | | |
|---|---|---|---|
| 4,175,587 | 11/1978 | Chadwick | 123/300 |
| 4,391,133 | 7/1983 | Ito | 73/119 A |
| 4,437,391 | 3/1984 | Ito | 73/119 A |
| 4,483,480 | 11/1984 | Yasuhara | 73/DIG. 4 |
| 4,503,820 | 3/1985 | Nakagawa | 123/494 |
| 4,541,284 | 9/1985 | Guagaiumi | 73/DIG. 4 |
| 4,550,744 | 11/1985 | Igashira | 123/447 |
| 4,622,942 | 11/1986 | Nozaki | 123/494 |

FOREIGN PATENT DOCUMENTS

| | | | |
|---|---|---|---|
| 3039972 | 5/1982 | Fed. Rep. of Germany | 123/498 |
| 59-018249 | 1/1984 | Japan | 123/496 |

OTHER PUBLICATIONS

Igashira, U.S. Ser. No. 06/754,750, filed Jul. 15, 1985.

Primary Examiner—Carl Stuart Miller
Attorney, Agent, or Firm—Cushman, Darby & Cushman

[57] ABSTRACT

A drive circuit for an electrostrictive element actuator for a fuel injection apparatus of a diesel engine. The drive circuit has a condenser adapted to be charged with electric charges generated by the electrostrictive element actuator; a combination of an electric charge transferring switching element and a rectifier element for becoming conductive in a first period and charging electric charges generated by the electrostrictive element actuator to the condenser; and a combination of an electric charge returning switching element and a rectifier element for becoming conductive in a second period, other than the first period, and returning electric charges stored in the condenser to the electrostrictive element actuator.

20 Claims, 9 Drawing Sheets

DRIVE CIRCUIT OF ELECTROSTRICTIVE ELEMENT ACTUATOR IN DIESEL ENGINE FUEL INJECTION DEVICE

BACKGROUND OF THE INVENTION

1. Field of the Invention

The present invention relates to a drive circuit of an electrostrictive element actuator, and a diesel engine fuel injection device having such a circuit. The drive circuit according to the present invention is arranged in a fuel injection device of a diesel engine, and is used for an actuator which realizes an effective pilot injection so as to reduce idling noise. Note that an electrostrictive element actuator device and a fuel injection device using the same are described in Igashira et al U.S. Ser. No. 754,750 (filed on July 15, 1985) by the same assignee as of the present invention.

2. Description of the Related Arts

Pilot injection is known to be effective in reducing the idling noise of a diesel engine. To realize this, an actuator comprising an electrostrictive element, for example a PZT, and a drive circuit thereof are also known. However, the drive circuit comprises a plurality of expensive switching elements, for example SCRs, pulse transformers, and coil cores. For this reason, it has been difficult to realize an inexpensive drive circuit having reliable operation characteristics.

SUMMARY OF THE INVENTION

It is an object of the present invention to provide an improved, inexpensive electrostrictive element drive circuit which has satisfactory operation characteristics and can reduce the number of expensive switching elements.

It is another object of the present invention to provide an improved fuel injection apparatus for a diesel engine which uses the drive circuit of the present invention.

According to the fundamental aspect of the present invention, there is provided a drive circuit for an electrostrictive element actuator, including an electrostrictive element actuator subject to a repetitive application of a load; a condenser adapted to be charged with electric charges generated by the electrostrictive element actuator; an electric charge transferring switching element for becoming conductive in a first period and charging the electric charge generated by the electrostrictive element actuator to the condenser, one terminal of the electric charge transferring switching element being grounded; a rectifier element connected in a circuit in parallel with the electric charge transferring switching element; an electric charge returning switching element for becoming conductive in a second period, other than the first period, and returning the electric charge stored in the condenser to the electrostrictive element actuator, one terminal of the electric charge returning switching element being grounded; and a rectifier element connected in parallel with the electric charge returning switching element.

The drive circuit for the electrostrictive element actuator according to the present invention can be used for a fuel injection pump. A voltage is generated by the electrostrictive element actuator in accordance with a hydraulic pressure of the fuel injection pump. At this time, the electric charge transferring switching element is turned ON to discharge the electrostrictive element actuator. The electrostrictive element actuator is thus constricted to realize a pilot injection, and electric charges discharged from the actuator are accumulated on the condenser. After a predetermined period of time has passed, the electric charge returning switching element is turned ON to return the electric charges on the condenser to the electrostrictive element actuator.

BRIEF DESCRIPTION OF THE DRAWINGS

FIG. 1 (1A and 1B) is a block diagram of a drive circuit for an electrostrictive element actuator according to an embodiment of the present invention;

DESCRIPTION OF THE PREFERRED EMBODIMENTS

Figure 1A:
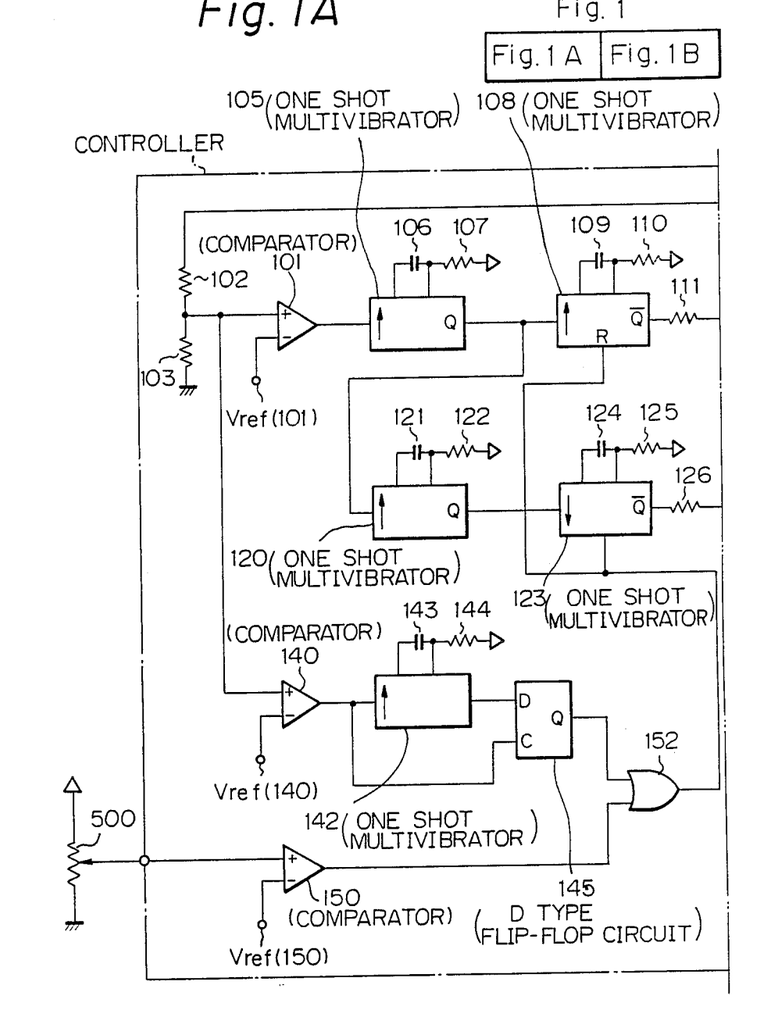
Figure 1B:
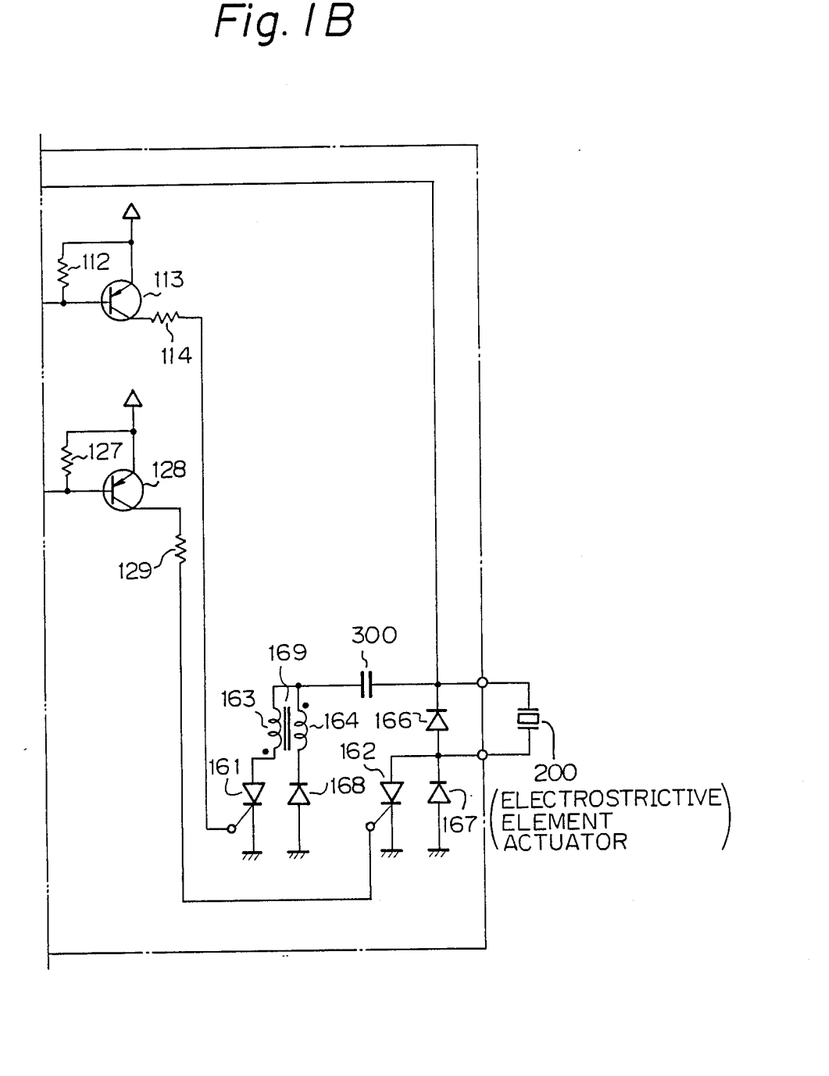

FIGS. 1A and 1B show a drive circuit for an electrostrictive element actuator according to an embodiment of the present invention.

Figure 2:
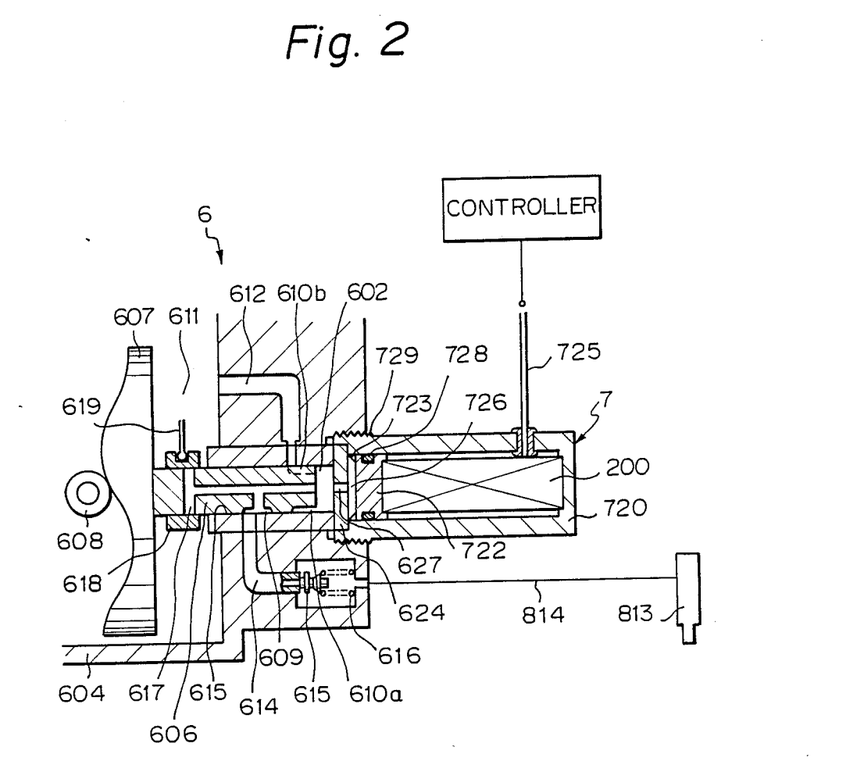
FIG. 2 is a sectional view when the circuit shown in FIG. 1 is mounted on a distribution type fuel injection pump.

FIG. 2 shows a distribution type fuel injection pump to which the circuit shown in FIG. 1 is applied. In a distribution type fuel injection pump 6 in FIG. 2, a fuel injection control device 7 is coupled directly to a pump chamber 602 thereof.

An arrangement of the fuel injection pump 6 will now be described with reference to FIG. 2. A plunger 606 slidable in a cylinder bore 605 of a casing 604 is rotated and reciprocated in synchronism with a period of half an engine speed. More specifically, the rotation of an engine is transmitted to a drive shaft (not shown) through a gear or a timing belt (not shown). The plunger 606 is then rotated coaxially with the drive shaft, and is reciprocated when a face cam 607 is engaged with a roller 608. The face cam 607 is biased by a biasing force of a spring (not shown) to be engaged with the roller 608, and the plunger 606 reciprocates in such a manner that the roller 608 is rotated about its axis along the cam surface of the face cam 607. A distribution port 609 and intake ports 610a and 610b corresponding in number to the number of engine cylinders are formed in the outer periphery of the plunger 606, and a pump chamber 602 is formed between an end face of the plunger 606 and the cylinder bore 605.

A low pressure chamber 611, an intake path 612 for communicating the chamber 611 with the cylinder bore 605, and distribution paths 614 which can communicate external injection valves 813 with the cylinder bore 605 are formed in the casing 604. The distribution paths 614 are provided to correspond in number to the number of engine cylinders, and a delivery valve 615 is provided midway along each path 614. Each delivery valve 615 can be opened against a spring 616, and serves both as a check valve and a retraction valve.

When the plunger 606 moves to the left in FIG. 2 to expand the pump chamber 602, one of the intake ports 610 communicates with the corresponding intake path 612, and fuel in the low pressure chamber is supplied to the pump chamber 602. On the contrary, when the plunger 606 moves to the right (FIG. 2) to compress the pump chamber 602, the distribution port 609 communicates with one of the distribution paths 614, and fuel in the pump chamber 602 is fed externally. Fuel feeding is started when the plunger 606 begins to move to the right, and ends when a spill port 617 is open to the low pressure chamber 611 from the right end face of a spill ring 618.

Note that the spill port 617 is an opening formed in the plunger 606 to communicate the pump chamber 602 with the low pressure chamber 611, and the spill ring 618 has a short cylindrical shape, in an inner opening of which the plunger 606 slides. The position of the spill ring 618 can be changed by a lever 619, and an injection amount from the pump chamber 602 depends on the position of the ring 618. The lever 619 is interlocked indirectly with an accelerator lever. The above arrangement is known to those skilled in the art.

The fuel injection control device 7 comprises an electrostrictive element actuator 200, a piston 722, a Belleville spring 723, and a distance piece 624 in a casing 720. The casing 720 has a cylindrical shape with a bottom, i.e., a bag-like shape, and is fixed to the injection pump 6 by a male thread 729 of an open end portion thereof.

The electrostrictive element actuator 200 consists of 50 thin disk-shaped electrostrictive elements having a diameter of 15 mm and a thickness of 0.5 mm stacked one upon the other to form a columnar shape. Each electrostrictive element is of a ceramic material, a so-called PZT, and contains lead zirconate titanate as a major component thereof. When a 500 V voltage is applied in a direction of thickness of the element, the element is expanded by about 0.5 $\mu$m. Accordingly, when the 500 V voltage is applied to the 50 elements in the direction of thickness thereof, a total expansion of 25 $\mu$m can be obtained. When the voltage is cancelled or a small negative voltage is applied thereto, the 50 elements are constricted by 25 $\mu$m to return to the original length.

Figure 3:
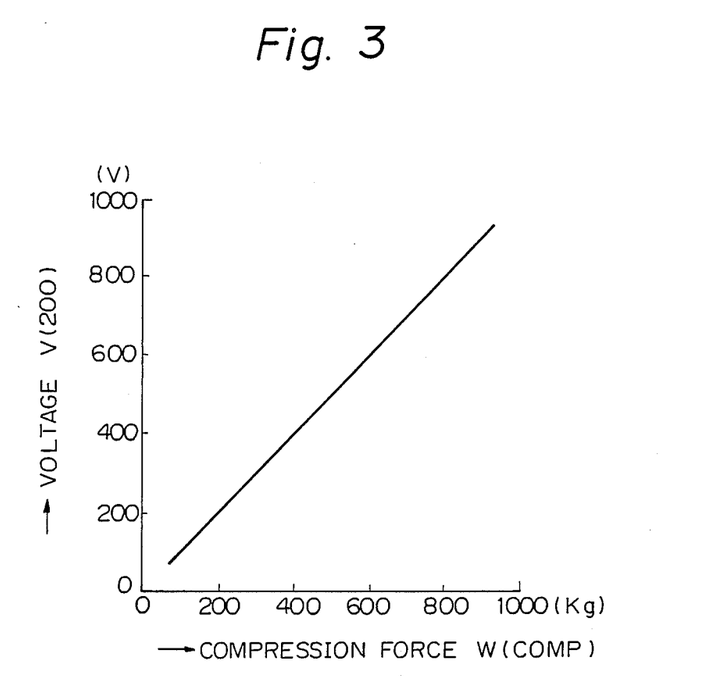
FIGS. 3 and 4 are graphs respectively showing a generated voltage and constriction in the electrostrictive element as a function of a compression force.

When a compression force W (COMP) is applied to the electrostrictive element actuator 200 in its axial direction, each electrostrictive element produces a voltage V(200) shown in FIG. 3. More specifically, when a 500 kg load is applied to the elements, a 500 V voltage is produced therefrom. These characteristics of the electrostrictive elements and the electrostrictive element actuator are known to those skilled in the art.

Figure 4:
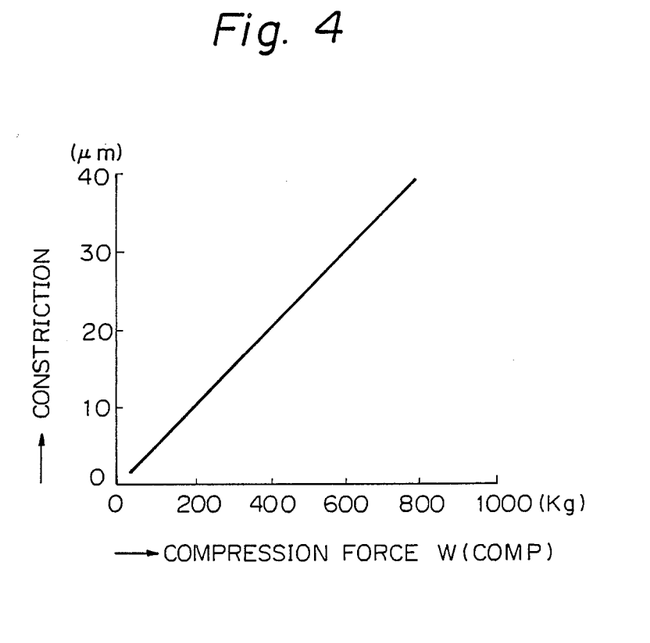

When the voltage applied to actuator 200 is short-circuited, the electrostrictive element actuator 200 can then be constricted by an axial constriction CONSTR, as shown in FIG. 4. More specifically, when a 500 kg load is applied to the piston 722 and the actuator voltage and is short-circuited, a 25 $\mu$m constriction is produced.

Voltage application, short-circuiting, opening, and the like of the electrostrictive element actuator 200 at given timings are controlled by an external controller.

Expansion/constriction of the electrostrictive element actuator 200 is transmitted to the piston 722 to expand or constrict a volume of a variable volume chamber 726 defined by the piston 722, the distance piece 624, and the casing 720. The Belleville spring 723 is arranged in the chamber 726 and biases the actuator 200 in the constriction direction.

The distance piece 624 has a disk shape, and has a through hole 627 at its center. The diameter of the distance piece 624 is larger than that of the piston 722. When the male thread 29 of the casing 720 is screwed in, the distance piece 624 is sandwiched between the casings 720 and 604 to provide a seal therebetween. The variable volume chamber 726 communicates with the pump chamber 602 through the through hole 627.

An O-ring 728 is arranged on the outer periphery of the piston 722 to prevent a leakage of pressure from the variable volume chamber 726 side to the actuator 200 side through the piston 722.

Figure 5:
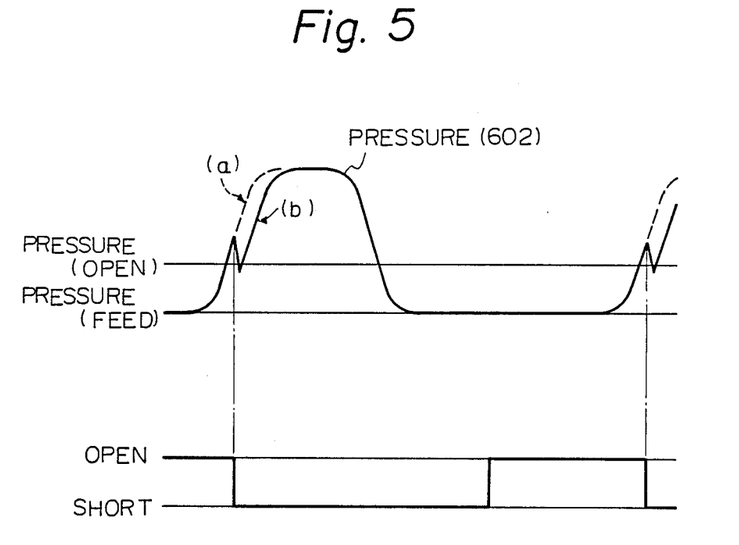
FIG. 5 is a timing chart for explaining the operation of an electrostrictive element actuator.
Figure 6:
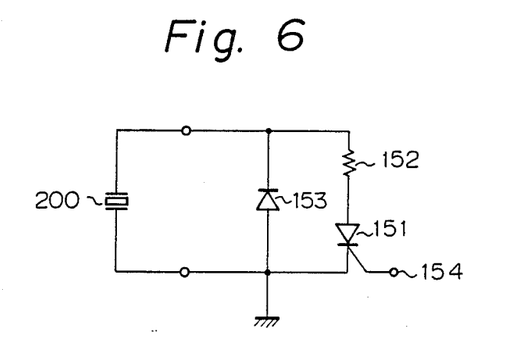
FIG. 6 is a partial circuit diagram of a conventional drive circuit for an electrostrictive element.

The operation of the electrostrictive element actuator will be described with reference to FIGS. 5, 6, and 7. When no external voltage is applied to the actuator 200 and it is not short-circuited, that is, when it is electrically open circuited, a pressure PRESSURE (602) of the pump chamber 602 is as indicated by an upper dotted curve (a) in FIG. 5. A projected region of the curve shown in FIG. 5 indicates the delivery stroke and, more specifically, the moment at which the plunger 606 is moving to the right and the spill port 617 is covered with the spill ring 618. A curve region higher than an open pressure PRESSURE (OPEN) of the injection valves 813 is subject to fuel injection. More specifically, during this period the injection valves 813 are open, and the valve-opening lift thereof is proportional to the pressure thereof. Therefore, an injection amount is also substantially proportional to that pressure.

The electrostrictive element actuator 200 produces electric charges proportional to the pressure PRESSURE (602) of the pump chamber 602, thus generating the voltage V (200) shown in FIG. 3. If the pressure of the pump chamber 602 is to be converted into a compression force W (COMP) in FIG. 3, it need only be multiplied with a pressure receiving area of the piston 722. In the case of FIG. 2, the pressure receiving area of the piston 722 is about 4 cm$^2$, and the valve-opening pressure of the injection valve 813 is set at 100 kg/cm$^2$. Therefore, a 400 V voltage is generated by the actuator 200 at the beginning of a period of fuel injection.

When the voltage generated by the actuator 200 increases and reaches 500 V, the controller short-circuits the actuator 200 at a predetermined timing immediately after the injection valve 813 begins to inject fuel, thus decreasing the voltage to 0 V.

At this time, since the actuator 200 is constricted by 25 $\mu$m, as shown in FIG. 4, the variable volume chamber 726 produces an expansion of 4 cm$^2 \times$ 25 $\mu$m = 10 mm$^3$. Thereby, the pressure of the pump chamber 602 is decreased to decrease the injection pressure from the injection valve 813. The pressure of the pump chamber 602 then becomes as represented by a curve (b) in FIG. 5. In the latter case, fuel injection by the injection valve 813 is temporarily interrupted, thus realizing a pilot injection.

As the amount of constriction of the actuator 200 grows larger, the pressure of the pump chamber 602 is significantly decreased, thus guaranteeing a stable pilot injection. Since an interval between the pilot and main injections can be widened, the reduction of noise and vibration is significant. According to the present invention electric charges from the actuator 200 are accumulated on a condenser, and are later re-used to increase the amount of constriction of the actuator 200, thereby enhancing the pilot injection effect.

A drive operation of the electrostrictive element actuator will be explained in comparison with the related art. FIG. 6 shows a drive circuit which merely short-circuits the electrostrictive element actuator. In FIG. 6 a thyristor 151 is connected in parallel with the actuator 200 with a current limiting resistor 152 in series with thyristor 151.

Reference numeral 153 denotes a diode, which is connected in a reverse direction. That is, the cathode of diode 153 is connected to the high voltage side, and the anode is connected to the low voltage side, so as to protect the actuator 200 from possible application of any reverse voltage. When a trigger signal is supplied to a gate terminal 154 of the thyristor 151, the thyristor 151 short-circuits and thereby constricts the actuator 200.

This operation will be described with reference to the timing chart of FIG. 7. FIG. 7(2) shows the pressure PRESSURE (602) of the pump chamber 602. When the actuator 200 is in the open state, the voltage V (200) proportional to the pressure of the pump chamber 602 is produced by the actuator 200 (FIG. 7(4)). When the voltage V(200) reaches the predetermined voltage (500 V) corresponding to the valve-opening pressure PRESSURE (OPEN) of the valve 813, it is detected and a trigger signal S (151,TRIGGER) is generated to enable the thyristor 151. Then, the actuator 200 is constricted to correspond with the voltage (500 V).

Figure 7:
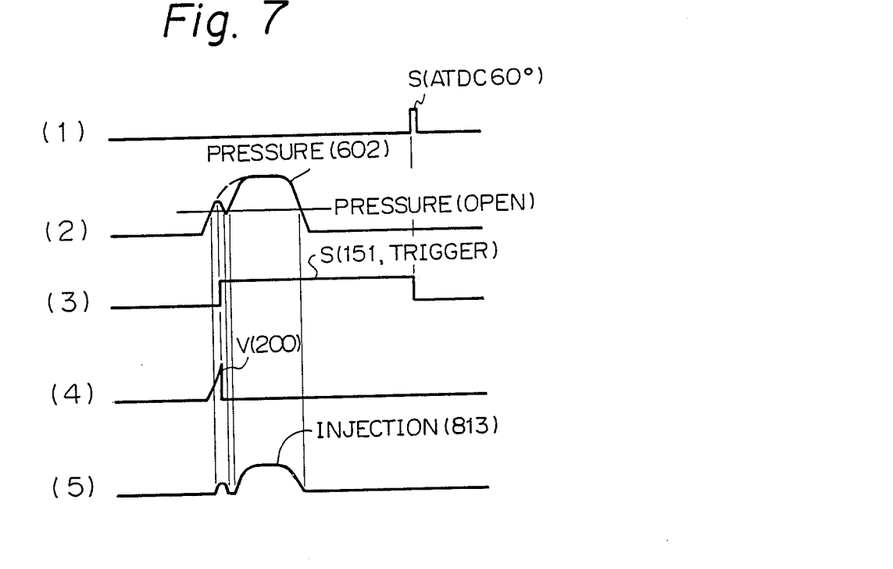
FIG. 7 is a timing chart for explaining the operation of the circuit shown in FIG. 6.

As previously described, the pressure of the pump chamber 602 is then decreased to interrupt fuel injection, thus performing a pilot injection, as shown in FIG. 7(5). In FIG. 7, INJECTION (813) indicates a fuel injection ratio of the injection valve 813.

When the amount of constriction of the actuator 200 is increased, the noise and vibration reduction effect can be enhanced, as described previously. For this purpose, a drive circuit shown in FIG. 1 is used according to the present invention to accumulate and re-use electric charges from the actuator 200.

Figure 8:
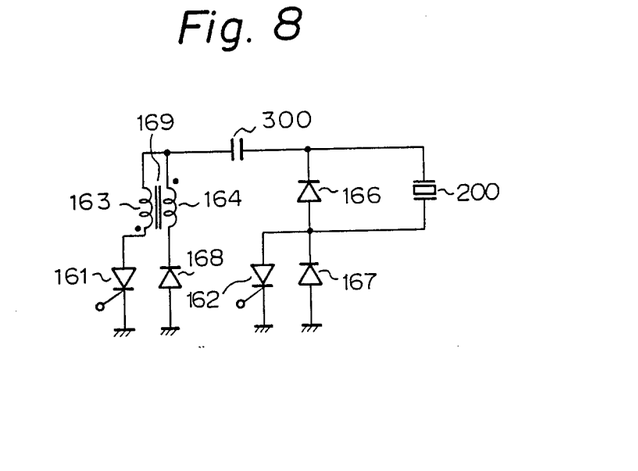
FIG. 8 is a partial circuit diagram of the drive circuit shown in FIG. 1.

FIG. 8 shows a main part of the drive circuit shown in FIG. 1. One terminal of a condenser 300 is connected to a high voltage side of the actuator 200, and the other terminal thereof is connected to a node between coils 163 and 164 wound in a given direction around an iron core 169. The other end of the coil 163 is connected to the anode of a thyristor 161, the cathode of which is grounded. The other end of the coil 164 is connected to the cathode of a diode 168, the anode of which is grounded. The low voltage side of the actuator 200 is connected to the anode of a thyristor 162, the cathode of which is grounded. The cathode of a diode 167 is connected to the low voltage side of the actuator 200 in parallel with the thyristor 162, and the anode thereof is grounded. A diode 166 is connected in parallel with the actuator 200 to protect actuator 200 from a reverse voltage. When the voltage V (200) from the actuator 200 reaches the predetermined voltage corresponding to the valve opening pressure PRESSURE (OPEN), a first trigger signal S (161,TRIGGER) is supplied to the gate of the thyristor 161 (FIG. 9(2)), thereby enabling the thyristor 161. In this state, a series resonance circuit consisting of the actuator 200, the coil 163, the condenser 300, and the diode 167 is formed, and electric charges produced by the actuator 200 are transferred to the condenser 300. Therefore, the actuator 200 is connected to a circuit which assumes a state similar to the short-circuited state, and thus is constricted as though it was short-circuited.

At this time, the pressure PRESSURE (602) of the pump chamber 602 is decreased due to the constriction of the actuator 200 and a pilot injection is performed, as described above (FIG. 9(5)). Next, the thyristor 162 is triggered by a trigger signal S (162,TRIGGER) during an interval after the compression stroke of the pump is completed until the next compression stroke begins (FIG. 9(3)). Thus, the thyristor 162 is enabled, and a series resonance circuit consisting of the condenser 300, the coil 164, the actuator 200, and the diode 168 is formed. Since the electric charges accumulated on the condenser 300 are then transferred to the actuator 200, a 300 V voltage is applied to the actuator 200.

The next compression stroke is then started. At this time, since the voltage V (200) of the actuator 200 has already reached 300 V, the voltage increases as compression is performed, and reaches 800 V (=300 V +500 V) at a timing to trigger the thyristor 161. Since the thyristor 161 is enabled at that timing, an amount of constriction corresponding to the 800 V voltage can be obtained. The amount of constriction can be 1.6 times that of the conventional circuit, which simply short-circuits the actuator 200, because the application voltage is increased from 500 V to 800 V. Thus, the pilot injection effect can be improved, and the noise and vibration reduction effect enhanced.

The controller in the circuit shown in FIG. 1 will be explained below. Reference numeral 101 denotes a first comparator having a non-inverting input which receives a terminal voltage from the actuator 200 voltage divided by resistors 102 and 103. The inverting input of the comparator 101 receives a reference voltage $V_{ref}$ (101). When the terminal voltage of the actuator 200 exceeds 800 V, the output from the first comparator 101 goes to "1" level. The output from the comparator 101 is connected to the rising trigger input of a re-triggerable first one-shot multivibrator 105.

An output pulse width of the first one-shot multivibrator 105 is determined by a condenser 106 and a resistor 107. In the circuit of FIG. 1, the pulse width is set to be slightly longer than a pump compression stroke interval during idling, about 15 msec.

In a high load state, since the compression stroke interval is prolonged, the pressure is increased, and the voltage from the actuator exceeds the reference voltage $V_{ref}$ (101) even after first short-circuiting for a pilot injection. Therefore, the pulse width is set as above to prevent a plurality of short-circuiting operations from occurring.

While the multivibrator 105 is generating a signal, an unnecessary signal is masked. The output from the multivibrator 105 is connected to the rising-trigger input of a second one-shot multivibrator 108. An output pulse width of the multivibrator 108 is determined by a condenser 109 and a resistor 110. Since this pulse width is that of the trigger signal for triggering the thyristor 161, it can be short, for example, 30 μs.

The output from the multivibrator 108 is connected to the base of a transistor 113 through resistors 111 and 112. When an output $\overline{Q}$ (inverted Q) from the multivibrator 108 is at "0" level, the transistor 113 is turned ON. The collector of the transistor 113 is connected to the gate of the thyristor 161 through a resistor 114. Therefore, when the transistor 113 is turned ON, the thyristor 161 is triggered to be enabled.

The output from the multivibrator 105 is also connected to the rising trigger input of a third one-shot multivibrator 120. An output pulse width of the multivibrator 120 is determined by a condenser 121 and a resistor 122. This pulse width is used to determine a timing for triggering the thyristor 162, and corresponds to an interval between two pump compression stroke(s), for example, about 20 ms.

The output from the multivibrator 120 is connected to the falling-trigger input of a fourth one-shot multivibrator 123. An output pulse width of the multivibrator 123 is determined by a condenser 124 and a resistor 125 and is set to be about 30 μs.

The $\overline{Q}$ output from the multivibrator 123 is connected to the base of a transistor 128 through resistors 126 and 127. When the $\overline{Q}$ output from the multivibrator 123 is "0" level, the transistor 128 is turned ON. The collector of the transistor 128 is connected to the gate of the thyristor 162 through a resistor 129. When the transistor 128 is turned ON, the thyristor 162 is triggered to be enabled.

The voltage from the actuator 200, which is voltage divided by the resistors 102 and 103, is also connected to the non-inverting input of a second comparator 140. The inverting input of the comparator 140 receives a reference voltage $V_{ref}(140)$. When the terminal voltage of the actuator 200 exceeds 600 V, the output from the comparator 140 goes to "1" level.

The output from the comparator 140 is connected to the rising-trigger input of a fifth one-shot multivibrator 142. An output pulse width of the multivibrator 142 is determined by a condenser 143 and a resistor 144. The pulse width corresponds to a pump compression cycle, that is, in a 4-cylinder engine, 25 msec, when the engine speed is at 1,200 rpm.

The output from the multivibrator 142 is connected to the D input of a D flip-flop 145, the clock input of which receives the output from the second comparator 140. The output from the D flip-flop 145 is connected to one input of a 2-input OR gate 152.

Reference numeral 500 denotes a potentiometer which is interlocked with an accelerator pedal (not shown) to produce a voltage signal corresponding to a load. The voltage signal from the potentiometer 500 is connected to the non-inverting input of a third comparator 150. The inverting input of the comparator 150 receives a reference voltage $V_{ref}(150)$. When an accelerator opening exceeds, for example, 10%, the output from the comparator 150 goes to "1" level.

The output from the comparator 150 is connected to the other input of the 2-input OR gate 152. The output from the OR gate 152 is connected to the reset inputs of the second and fourth multivibrators 108 and 123. When the output from the OR gate 152 is at "1" level, the second and fourth multivibrators 108 and 123 are reset and a trigger signal is not generated.

The operation of the controller will be described below. Assuming that the engine speed and load to the engine are low, the cam lifts upon rotation of the pump drive shaft, and the pressure PRESSURE (602) of the pump chamber 602 increases. Accordingly, the actuator 200 is compressed to produce the voltage V (200). An initial value of the voltage V (200) is 300 V since the electric charges are transferred thereto from the condenser 300 during the previous operation. The voltage V (200) from the actuator 200 is voltage divided by the resistors 102 and 103, and is then compared with the reference voltage $V_{ref}(101)$ by the first comparator 101.

Figure 9:
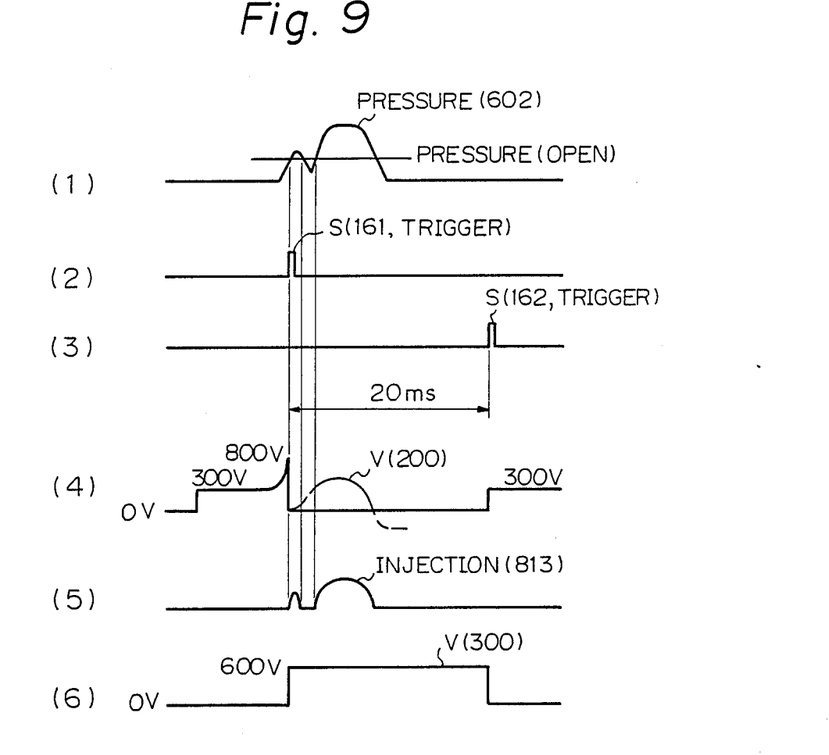
FIG. 9 is a timing chart for explaining the operation of the circuit shown in FIG. 8.

When the terminal voltage V (200) of the actuator 200 exceeds 800 V (FIG. 9(4)), the output from the comparator 101 foes to "1" level, thus triggering the multivibrator 105. At the leading edge of the output from the multivibrator 105, the second multivibrator 108 is triggered, and the transistor 113 is enabled through the resistors 111 and 112. Next, the thyristor 161 is triggered through the resistor 114 (FIG. 9(2)), and the electric charges from the actuator 200 are accumulated on the condenser 300. For this reason, the voltage applied to the actuator 200 is decreased to 0 V, and the actuator 200 is constricted by about 40 μm. As previously described, the pressure PRESSURE (602) of the pump chamber 602 is decreased (FIG. 9(1)), and fuel injection is interrupted (FIG. 9(5)).

The thyristor 161 is automatically commutated due to resonation of the coil 163 to be disabled. At this time, since the cam is lifting, fuel compression is continued, and the pressure of the pump chamber 602 is increased again to resume the fuel injection. Before the cam lift reaches its upper dead point, the spill port described above is opened, and the pressure of the pump chamber is spilled, thus completing the fuel injection. At this time, the terminal voltage V (200) of the actuator 200 is about to decrease to a negative voltage, as indicated by a broken line in FIG. 9(4). However, if the terminal voltage is decreased to a considerable negative level, polarization of the actuator 200 may be lost. Therefore, the reverse voltage is short-circuited by the diode 166 to protect the actuator 200. In synchronism with the leading edge of the multivibrator 105, the third multivibrator 120 is also triggered. At the trailing edge of the output from the multivibrator 120, the fourth multivibrator 123 is triggered. About 20 ms after the thyristor 161 was triggered, the fourth multivibrator 123 generates a trigger signal to trigger the thyristor 162 (FIG. 9(3)). At this time, the pump pressure feed process is completed, and the pressure of the pump chamber is low to prepare for the next compression stroke. Upon enabling of the thyristor 162, the electric charges accumulated on the condenser 300 are returned to the actuator 200, thereby increasing the terminal voltage V (200) of the actuator 200 to about 300 V.

A method for disabling control of the electrostrictive element actuator 200 in accordance with engine conditions will now be described. Even though a pilot injection is performed in the high load state or high engine-speed state, this cannot effectively reduce noise and vibration. In addition, if the pilot injection is performed, the necessary engine power is decreased. Therefore, in such a state, the electrostrictive element actuator 200 is not controlled. For example, when a load is high, the output voltage from the potentiometer 500 is increased, and the output from the third comparator 150 goes to "1" level when the load exceeds a preset value. This voltage signal resets the first and fourth multivibrators 108 and 123 through the OR gate 152. More specifically, in the high load state, since trigger signals for the thyristors 161 and 162 are not generated, control of the electrostrictive element actuator is not performed and the actuator remains open. This also applied to the case of the engine speed. The output from the second comparator 140 goes to "1" level for each compression stroke. When this "1" level cycle is shorter than the output pulse width, for example, 25 ms, of the fifth multivibrator 142, the output from the D flip-flop 145 goes to "1" level, and resets the first and fourth multivibrators 108 and 123 through the OR gate 152. For this reason, trigger signals for the thyristors 161 and 162 are not generated, thus disabling the control operation of the electrostrictive element actuator 200.

Figure 10:
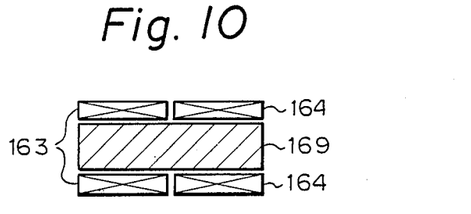
FIG. 10 is a sectional view of a coil for explaining another embodiment of the present invention.

Various modifications may be made beside the above embodiment of the present invention. For example, if the coils 163 and 164 are wound around different iron cores, the same effect as above can be obtained. When the coils 163 and 164 are wound around a single iron core, they can be wound therearound so as not to overlap each other, as shown in FIG. 10. Thus, a voltage produced from one coil upon operation of one thyristor is induced in the other coil, and the generation of a surge voltage, which will damage the other thyristor, can be eliminated.

Figure 11:
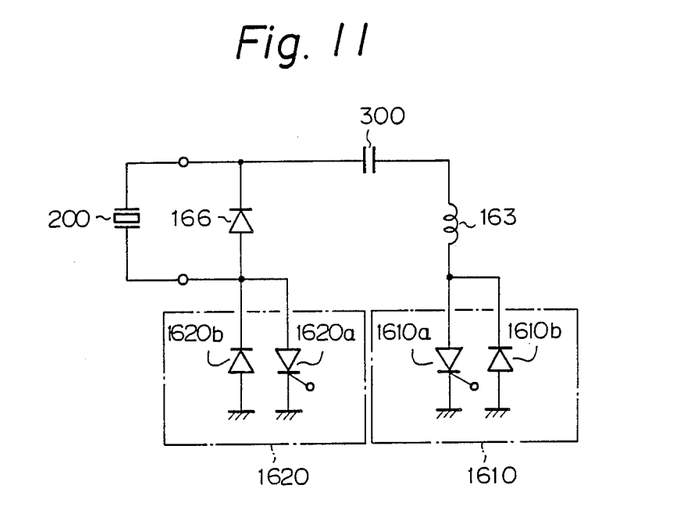
FIGS. 11 and 12 are circuit diagrams for explaining still another embodiments of the present invention.

When a circuit arrangement shown in FIG. 11 with a single coil is adopted, the pairs of the thyristor 161 and the diode 168, and the thyristor 162 and the diode 167 can be replaced with reverse-connected thyristors 1610 and 1620. In this case, thyristors with a high dv/dt breakdown voltage, such as an electrostatic induction thyristor, for example, SiT thyristor, can be used, or a CR absorber can be added between the anode and cathode of the thyristor. In the circuit of FIG. 11, the coil 163 can be replaced with a resistor. Also, in this case, a degradation of the polarization of the electrostrictive element actuator can be prevented.

Figure 12:
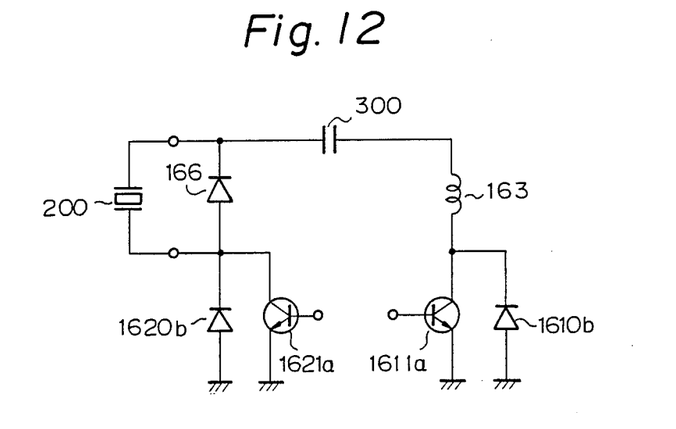

A circuit configuration shown in FIG. 12 also can be used. Referring to FIG. 12, transistors 1611a and 1621a are provided in place of the thyristors 1610a and 1620a in FIG. 11. Signals supplied to the bases of the transistors 1611a and 1621a must have a pulse width of 100 to 300 µs unlike the trigger signals S (161, TRIGGER) and S (162,TRIGGER) supplied to the gates of the thyristors 1610a and 1620a. This can cope with increasing capacitances of condensers and resistances of resistors for the one-shot multivibrators 108 and 123. In addition, the inductance of the coil 163 must be increased to decrease a peak value of a current flowing through the transistors 1611a and 1621a.

When the inductance of the coil 163 is increased, abrupt constriction of the electrostrictive element actuator 200 can be avoided as well as a decrease in the current peak value. As a result, noise due to such an abrupt constriction of the actuator 200 can be eliminated. This effect can be obtained by increasing the inductance of the coil 163 or 164 in the circuit configurations of FIGS. 11 and 12.

In the apparatus shown in FIG. 2, the electrostrictive element actuator can be controlled without requiring an external high voltage power source, and the amount of constriction can be doubled when compared to a conventional method in which the actuator is simple short-circuited. Therefore, the pilot injection effect can be enhanced, and noise and vibration can be reduced.

In the circuit shown in FIG. 1, one end of a switching element is grounded and a rectifier element is connected in parallel with the switching element. Thereby, a pulse transformer, which is conventionally necessary for a control input circuit of the switching element, can be omitted. More specifically, the cathode of a thyristor as the switching element is grounded. Then, the ON/OFF control input of the thyristor can be kept constant, for example, 5 V, and the pulse transformer, which is a countermeasure against unstable control input, can be omitted. A diode, connected in parallel with the switching element, can serve to charge or discharge a condenser.

In the circuit of FIG. 1, electric charges generated by the electrostrictive element are accumulated on the condenser upon operation of a resonance circuit, and can be re-used for expanding the electrostrictive element. Thus, a large amount of expansion/constriction of the electrostrictive element actuator can be obtained without a high-voltage power source.

When two coils are wound around an identical iron core, the number of iron cores can be reduced, resulting in a decrease in costs.

The polarization of the electrostrictive element is gradually degraded due to repetitive loads, and the amount of expansion/constriction thereof is reduced accordingly. As for the degradation in polarization, in the circuit of FIG. 1, a 300 V voltage is repeatedly applied to the electrostrictive element, and such degradation can be thus prevented.

We claim:

1. A drive circuit of an electrostrictive element actuator for use with a fuel injection device comprising:
   an electrostrictive element actuator;
   condenser means for storing electric charges generated by said electrostrictive element actuator;
   electric charge transferring switching means, connected to receive charge from said electrostrictive element actuator at one terminal thereof, and connected to ground at another terminal, for conducting between said terminals thereof during a first period and applying electric charges generated by said electrostrictive element actuator to said condenser means during said first period;
   a first rectifier element connected in parallel with said electric charge transferring switching means;
   electric charge returning switching means, connected to provide charge to said actuator at one terminal thereof and connected to ground at another terminal thereof, for conducting between said terminals thereof, during a second period other than the first period, to couple charge stored in said condenser means to said electrostrictive element actuator during said second period;
   a second rectifier element, connected in parallel with said electric charge returning switching means;
   means for detecting a predetermined voltage of said actuator indicative of a predetermined hydraulic pressure of said fuel injection device;
   means for turning on said electric charge transferring switching means upon detecting said predetermined voltage, to discharge said electrostrictive element actuator into said condenser means, and thereby constrict said actuator; and
   means for turning on said electric charge returning switching means a predetermined time after said detecting said predetermined voltage, to return said charge on said condenser means to said actuator.

2. A circuit according to claim 1, wherein said means for detecting a predetermined voltage includes means for detecting a voltage generated by said electrostrictive element actuator that is higher than a voltage of said condenser means.

3. A circuit according to claim 1, further comprising a current limiting element, connected to said electric charge transferring switching means and to said electric charge returning switching means.

4. A circuit according to claim 3, wherein said current limiting element is a coil means having an inductance.

5. A circuit according to claim 4, wherein said coil means having an inductance consists of two coils each having inductances.

6. A circuit according to claim 5, wherein said two coils having inductances are wound on a same magnetic core.

7. A circuit according to claim 6, wherein said two coils having inductances are wound on said same magnetic core without any overlapping portions.

8. A circuit according to claim 6, wherein said two coils are wound in a same direction on said magnetic core, one terminal of said condenser means being connected to a high potential terminal of the electrostrictive element actuator, and the other terminal of said condenser means being connected to the junction of said two coils, said electric charge transferring switching means comprising a first thyristor, an anode of which is connected to a terminal of one of said two coils, and a cathode of the first thyristor being grounded, said first rectifier comprises a first diode with a cathode connected with the other of said two coils and an anode grounded, said electric charge returning switching means comprising a second thyristor, the low potential terminal of the electrostrictive element actuator being connected to an anode of said second thyristor, and a cathode of the second thyristor being grounded, and said second rectifier comprises a second diode connected in parallel with the second thyristor.

9. A circuit according to claim 4, wherein said electric charge transferring switching means comprises a first thyristor, an anode of said first thyristor being connected to a terminal of a coil, and a cathode of the first thyristor being grounded, said first rectifier comprises a first diode connected in parallel with the first thyristor, said electric charge returning switching means comprising a second thyristor, an anode of which is connected to the low potential terminal of the electrostrictive element actuator and a cathode of the second thyristor being grounded, and said second rectifier comprises a second diode connected in parallel with the second thyristor.

10. A circuit according to claim 4, wherein said electric charge transferring switching means comprises a first transistor, a collector of said first transistor being connected to a terminal of said coil, and an emitter of the first transistor being grounded, said first rectifier comprises a diode connected in parallel with the first transistor, said electric charge returning switching means comprises a second transistor, a collector of said second transistor being connected to the low potential terminal of the electrostrictive element actuator, and an emitter of the second transistor being grounded, and said second rectifier comprises a second diode connected in parallel with the second transistor.

11. A fuel injection device for a diesel engine having a driving circuit of an electrostrictive element actuator, and being adapted to introduce fuel into a pump chamber formed by a cylindrical bore of a fuel injection pump and a plunger slidably fitted in said cylindrical bore to change a volume of said pump chamber and press the fuel to inject the fuel through an injection valve, said driving circuit of the electrostrictive element actuator comprising:

an electrostrictive element actuator which is extended and constricted responsive to an applied voltage;

condenser means for storing electric charges generated by said electrostrictive element actuator;

an electric charge transferring switching means, including a first rectifier element, for becoming conductive during a first period and applying charges generated by said electrostrictive element actuator to said condenser means during said first period;

electric charge returning switching means including a second rectifier element for becoming conductive during a second period other than the first period, to couple charge stored in said condenser means to said electrostrictive element actuator during said second period;

a variable volume chamber, selectively communicating to said pump chamber and connected to said electrostrictive element actuator to have a volume varied by said electrostrictive element actuator being extended and constricted;

means for controlling said extension/constriction of said electrostrictive element actuator during said first period to make said electric charge transferring switching element conductive to charge said condenser means with electric charges generated in said electrostrictive element actuator to cause said electrostrictive element actuator to constrict and thereby increase said volume of said variable volume chamber, thereby decreasing the rate of fuel injection from the injection valve; and means for controlling said electrostrictive element actuator during said second period to make said electric charge returning switching element conductive to return the electric charges stored in said condenser means to said electrostrictive element actuator thereby increasing a constriction amount of said electrostrictive element and preventing a deterioration of said electrostrictive element actuator.

12. A fuel injection device according to claim 11, further comprising means for detecting an engine rotational speed based on a voltage generated by said electrostrictive element actuator, and wherein a control of the fuel injection rate is interrupted in accordance with the engine rotational speed.

13. A fuel injection device according to claim 11, further comprising means for detecting a load of the engine, wherein a control of the fuel injection rate is interrupted in accordance with said load.

14. A control device for a fuel injection pump, comprising:

an electrostrictive actuator, having a high voltage terminal and a low voltage terminal, adapted to be mechanically coupled to said fuel injection pump;

means for storing electric charge, having a first end electrically connected to said high voltage terminal of said actuator;

first thyristor means, connected between a second end of said charge storing means and a power supply terminal, for providing a discharge path from said actuator to said charge storing means when said first thyristor means is triggered into conduction;

second thyristor means, connected between said low voltage terminal of said actuator and said power supply terminal, for providing a charge path from said charge storing means to said actuator when said second thyristor means is triggered into conduction; and control means, connected to trigger inputs of said first and second thyristor means, for triggering said first thyristor means during a time of desired constriction of said actuator and for triggering said second thyristor means during a time of desired expansion of said actuator.

15. A device as in claim 4 further comprising a first diode connected in parallel across said first thyristor means in reverse-biased relation therewith, and a second diode, connected in parallel across said second thyristor means in reverse-biased relation therewith.

16. A device as in claim 15 further comprising an inductive coil in series between said second end of said charge storing means and said first thyristor means.

17. A device as in claim 16 wherein said power supply terminal is a power supply return, and said coil is connected to an anode of said first thyristor means, a cathode of said first thyristor means being connected to said power supply return, and an anode of said first diode being connected to said power supply return, a cathode of said first diode being connected to said coil.

18. A device in claim 14 wherein said first and second thyristor means are transistors.

19. A device as in claim 14 wherein said first and second thyristor means are thyristor devices.

20. A method of controlling a fuel injection pump that is connected to an electrostrictive actuator that has a high voltage terminal and a low voltage terminal, and is mechanically coupled to the fuel injection pump, the high voltage terminal of the electrostrictive actuator being connected to a means for storing electric charge at a first end thereof, a first thyristor means connected between a second end of the charge storing means and a power supply terminal, and a second thyristor means connected between the low voltage terminal of the actuator and said power supply terminal, comprising the steps of:

determining a time of desired constriction of said electrostrictive actuator;

triggering said first thyristor means to provide a discharge path from said actuator to said charge storing means such that said actuator can be constricted, and such that voltage produced thereby is charged into said charge storing means;

determining a time of desired expansion of said electrostrictive actuator; and triggering said second thyristor means to provide a charge path from said charge storing means to said actuator, such that a voltage corresponding to said charge on said charge storing means is coupled to said electrostrictive actuator.

* * * * *

UNITED STATES PATENT AND TRADEMARK OFFICE
CERTIFICATE OF CORRECTION

PATENT NO. : 4,756,290

DATED : July 12, 1988

INVENTOR(S) : MORITUGU, et al.

It is certified that error appears in the above-identified patent and that said Letters Patent is hereby corrected as shown below:

IN THE CLAIMS:

Claim 15, line 1, "claim 4" should read -- claim 14 --.

Signed and Sealed this

Twenty-seventh Day of December, 1988

Attest:

DONALD J. QUIGG

*Attesting Officer*  *Commissioner of Patents and Trademarks*